Patented Sept. 23, 1924.

1,509,175

UNITED STATES PATENT OFFICE.

GILBERT R. POTTS, OF CONVENT, NEW JERSEY.

YEAST FOOD AND PROCESS OF MAKING SAME.

No Drawing.     Application filed December 26, 1923.   Serial No. 682,823.

*To all whom it may concern:*

Be it known that I, GILBERT R. POTTS, citizen of the United States, residing at Convent, in the county of Morris and State of New Jersey, have invented certain new and useful Improvements in Yeast Foods and Processes for Making Same, of which the following is a specification.

This invention relates to a syrup possessing special utility as a yeast food to be used in the art of bread making, though susceptible of other equivalent or analogous uses.

It is well known in the art of making bread that diastatic malt products have a stimulating effect upon yeast, and that when supplied in the proper form as yeast food, such products will greatly augment the action of the yeast used, so that a smaller amount of yeast may be used to accomplish the desired result.

Heretofore, and before the present invention, the food chemist and the breadmaker have resorted to various methods in the effort to utilize the yeast simulating property of diastatic malt in obtaining a bread having improved qualities. Different forms of malt and in different combinations have been used in these prior experiments and practices, with variable results, but the present invention is distinctively different from any product or process heretofore used in the bread-making art in the particular that it presents the malt extract in a form, with other ingredients, which has the effect of increasing and controlling the activity of all of the ingredients. The result of such a combination is the production of a superior yeast food which imparts to the finished bread loaf, in which it is used, desirable qualities differing from, and in many ways superior to, the qualities of bread made with any other product or ingredient. That is to say, the use in breadmaking of the new yeast food, made according to the present invention, provides a bread structure which is of a fine and even texture, the crust smooth and well colored, while the loaf will retain the moisture in the bread body, thus prolonging the freshness of the bread so that it will keep edible for many hours, thereby effecting an economy by reducing the waste from staleness.

In the attainment of the above objects the new bakers' syrup has the further definite advantage of being a substantial and practical substitute for a large proportion of the yeast ordinarily employed in commercial bread making, thus effecting material economies therein.

Generally, the invention consists of a syrup composed of malt extract, extract of hop, and maltose. These constituent parts are intimately amalgamated or merged into a syrup, but an important phase of the invention is making the infusion of hops with diastatic malt as the diastase of the malt makes the extraction of the active qualities of the hops more complete and thorough.

The reason for preparing a malt infusion with hops therein is to conserve entirely the lupulin which is the yellow granular aromatic powder situated at the base of the cones of the hop and which contains a volatile oil, a nitrogenous substance, and a bitter principle. Besides, the hop cones contain resins which are stimulating in their effect upon yeast. Therefore, the malt infusion with hops therein not only provides for the usual conversion of the starch of the grain into saccharine matter, but saturates the latter with the oils, resins and nitrogenous substances of the hops so that a yeast stimulant is made which modulates and controls the fermentation in the bread in such a manner that a very fine texture will be produced when the dough is baked, as well as a smoth well-colored crust formed of a density that assists in retaining the moisture within the loaf.

Another feature of practical importance in carrying out the invention is that of separately producing maltose and then incorporating it with the malt liquor and hop infusion. The introduction of sugar in this form and in a substantial quantity has been found to correct and neutralize excess acidity in the dough, and contributes to the formation of a crust having the characteristics referred to, and greatly increasing the fresh keeping quality of the bread.

Though susceptible of change as to minor details, a preferable way of manufacturing the novel bakers' syrup is to make a malt infusion with the necessary amount of hops, heating the said infusion to a temperature of about 160° Fahrenheit maintained for a period of one or more hours, after which the liquid is trained to remove the hop leaves, shells or husks. Then the liquid is evaporated into a syrup by the usual evaporating means. The syrup resulting from the evaporating step has added thereto the maltose, preferably in the proportion of 40 per cent to 60 per cent or 60 per cent to 40 per cent of the malt-hop syrup.

As an alternative method the hops may be incorporated directly in the infusion of grain from which the maltose is made, and such mixture is maintained at a temperature of at least 160° Fahrenheit for one or more hours, after which the liquid is strained to remove the hop particles, and then evaporated to a syrup in the usual manner. The liquid thus resulting from the step of evaporating has added thereto a malt syrup, preferably in the proportions above specified.

As to the proportion of hops used in either way, it has been found desirable and preferable to add the hops in about the amount of one-thirtieth by weight of the weight of the finished syrup, but this may be increased or decreased without departing from my invention.

While the present invention is not intended to be limited to a particular temperature at which the malt hop syrup and the maltose syrup are combined such merger or mixing together of the two syrups may advantageously be effected at a temperature considerably lower than the temperature at which the infusions are made, for instance at a temperature of less than 100° Fahrenheit in order that the diastase of the malt syrup will be inactive as to the maltose.

From the foregoing it will be observed that the materials employed in the preparation of the new bakers' syrup are entirely vegetable and free from all mineral salts and are wholesome and desirable additions to the composition of the bread, the same not only contributing to the nutritive character of the food, but also to its dietetic value because of a tonic effect, and the reduction made possible in the quantity of the active ferment (yeast) which is required when the syrup is used.

I claim:—

1. A yeast food for bread making and other uses consisting of a syrup composed of malt syrup, extract of hops, and maltose.

2. A yeast food for bread making and other uses consisting of a syrup composed of malt syrup, extract of hops, and maltose syrup.

3. A process for making a syrup or yeast food of the character described which consists in making an infusion of malt and hops, then evaporating the malt-hop liquid to the consistency of a syrup and subsequently adding maltose to the latter.

4. A process for making a yeast food which consists in making a syrup of malt and hops combined, separately preparing a maltose syrup, and subsequently mixing the two syrups.

In testimony whereof I hereunto affix my signature in the presence of two witnesses.

GILBERT R. POTTS.

Witnesses:
FRED'K. G. HOLZWARTH,
CARL KLEIBER.